United States Patent [19]

Karam et al.

[11] Patent Number: 5,269,966
[45] Date of Patent: Dec. 14, 1993

[54] METHOD OF MAKING ZINC SULFIDE PRECURSOR MATERIAL FOR A COPPER-ACTIVATED ZINC SULFIDE ELECTROLUMINESCENT PHOSPHOR

[75] Inventors: Ronald E. Karam, Towanda, Pa.; Aaron Wold, East Greenwich, R.I.

[73] Assignee: Osram Sylvania Inc., Danvers, Mass.

[21] Appl. No.: 999,634

[22] Filed: Dec. 31, 1992

[51] Int. Cl.⁵ .............................................. C09K 11/56
[52] U.S. Cl. .............................................. 252/301.6 S
[58] Field of Search ................. 252/301.6 S; 427/66, 427/70

[56] References Cited

U.S. PATENT DOCUMENTS

| | | | |
|---|---|---|---|
| 2,229,130 | 1/1941 | Romano | 252/301.6 S |
| 2,807,587 | 9/1957 | Butler et al. | 252/301.6 |
| 3,031,415 | 4/1962 | Morrison et al. | 252/301.6 |
| 3,031,416 | 4/1962 | Morrison et al. | 252/301.6 |
| 3,152,995 | 10/1964 | Strock | 252/301.6 |
| 3,154,712 | 10/1964 | Payne | 313/108 |
| 3,222,214 | 12/1965 | Lagos et al. | 117/201 |
| 3,657,142 | 4/1972 | Poss | 252/301.6 S |
| 4,496,610 | 1/1985 | Cattell et al. | 427/66 |
| 4,859,361 | 8/1989 | Reilly et al. | 252/301.6 S |
| 5,009,808 | 4/1991 | Reilly et al. | 252/301.6 S |

FOREIGN PATENT DOCUMENTS

| | | | |
|---|---|---|---|
| 508803 | 1/1955 | Canada | 427/70 |
| 59-18596 | 1/1984 | Japan | 427/66 |
| 3-86785 | 4/1991 | Japan | 252/301.6 S |

OTHER PUBLICATIONS

Royce et al. "RCA Technical Notes" 480, Sep. 1961.

*Primary Examiner*—Jack Cooper
*Attorney, Agent, or Firm*—Elizabeth A. Levy

[57] ABSTRACT

A zinc sulfide precursor material having axially symmetric platelet-type particles for a copper-activated zinc sulfide electroluminescent phosphor is made by reacting zinc- and copper-containing species with hydrogen sulfide and hydrogen chloride gases in a low-temperature vapor state reaction to obtain copper-containing zinc sulfide particles.

8 Claims, No Drawings

METHOD OF MAKING ZINC SULFIDE PRECURSOR MATERIAL FOR A COPPER-ACTIVATED ZINC SULFIDE ELECTROLUMINESCENT PHOSPHOR

CROSS-REFERENCE TO RELATED APPLICATIONS

This application is related to application Ser. Nos. 999,241 and 999,639, all filed concurrently herewith.

TECHNICAL FIELD

This invention relates to methods of making copper-activated zinc sulfide electroluminescent phosphors. In particular, it relates to a method of making a zinc sulfide precursor material for a copper-activated zinc sulfide electroluminescent phosphor by reacting a finely dispersed organic solution containing zinc -and copper-containing species with a gaseous mixture of hydrogen sulfide gas and hydrogen chloride gas in a low-temperature vapor state reaction to obtain particles of copper-containing zinc sulfide.

BACKGROUND ART

Electroluminescent lamps typically provide approximately 30 foot-lamberts of illumination and are thus suitable for various low-intensity illumination applications, such as decorative lighting, egress lighting, cockpit and dashboard display panels, and membrane switches. They have also been used as backlighting sources for liquid crystal display (LCD) devices. However, most LCD applications, including black/white and color LCD displays and high definition displays, require greater backlighting illumination than electroluminescent lamps can provide. Furthermore, most electroluminescent lamps have poor maintenance characteristics: they typically degrade to about half their initial brightness within 2000 hours of operation.

Zinc sulfide electroluminescent phosphors and methods of making them are described in U.S. Pat. Nos. 2,807,587 to Butler et al., 3,031,415 to Morrison et al., 3,031,416 to Morrison et al., 3,152,995 to Strock, 3,154,712 to Payne, 3,222,214 to Lagos et al., 3,657,142 to Poss, and 4,859,361 to Reilly et al., all of which are assigned to the assignee of the instant invention. However, none of these electroluminescent zinc sulfide phosphors are sufficiently bright for use in most LCD backlighting applications or high definition display devices.

It would be an advantage in the art to provide a copper-activated zinc sulfide electroluminescent phosphor having improved luminance and maintenance for use in LCD and high definition display devices, and a method of making the phosphor.

SUMMARY OF THE INVENTION

It is an object of the invention to obviate the disadvantages of the prior art.

It is another object of the invention to provide improved methods of making copper-activated zinc sulfide electroluminescent phosphors.

In accordance with one aspect of the invention, there is provided a method of making a zinc sulfide precursor material for a copper-activated zinc sulfide electroluminescent phosphor, comprising the steps of: introducing an organic solution as a finely dispersed mist into a heated reactor vessel, wherein the organic solution contains zinc- and copper-containing species and the heated reactor vessel is maintained at a reaction temperature of no greater than about 300° C., introducing a gaseous mixture comprising hydrogen sulfide gas and hydrogen chloride gas into the heated reactor vessel, and reacting the zinc- and copper-containing species with the gaseous mixture to form a precipitate consisting essentially of copper-containing zinc sulfide particles.

BEST MODE FOR CARRYING OUT THE INVENTION

For a better understanding of the present invention, together with other and further objects, advantages and capabilities thereof, reference is made to the following specification and appended claims.

Within the particles of a copper-activated zinc sulfide electroluminescent phosphor made by the methods disclosed in the above-identified U.S. patents, are concentrations of copper sulfide. It is believed that these copper sulfide concentrations create electrically conductive zones that exist as numerous parallel planes within each phosphor particle. When an electric field is applied to the phosphor particles, the electric field concentrates across the insulating zones between these conductive planes, since the conductive planes themselves cannot support an electric field.

It is believed that the luminescent intensity of electroluminescent phosphors is a function of the morphology of the phosphor particles. Phosphor particles which exhibit a preferred orientation under an applied electric field may provide superior luminance over those which do not exhibit such alignment capabilities. Zinc sulfide particles are generally spherically symmetric and thus exhibit little or no preferred orientation with respect to an applied electric field. However, optimum luminescence may be obtained if the electrically conductive zones within each particle are aligned such that they are perpendicular to the direction of the applied electric field. Thus, it would be advantageous to provide zinc sulfide particles having an axially symmetric, or platelet-type, particle morphology.

The instant method of making a zinc sulfide precursor material for a copper-activated zinc sulfide electroluminescent phosphor is a low-temperature vapor state reaction between zinc- and copper-containing species, hydrogen sulfide and hydrogen chloride. The zinc- and copper-containing species are provided by organic zinc and copper salts which, if solids, are first dissolved in an organic solvent. The resulting liquid organic solution must be very finely dispersed as a fine vapor or mist into a heated reactor vessel for the reaction to occur. The reactor vessel is heated to and maintained at a reaction temperature which is no greater than about 300° C. If either of the organic zinc or copper salts are in the liquid phase, they may be introduced as a finely dispersed mist directly into the reactor vessel without dissolution in an organic solvent. A gaseous mixture of hydrogen sulfide gas and hydrogen chloride gas and, optionally, an inert carrier gas, is also introduced into the reactor vessel. The zinc- and copper-containing species react with the gaseous mixture in the heated reactor vessel to produce a precipitate which consists essentially of copper-containing zinc sulfide particles.

The zinc sulfide particles produced by the method of this invention have a morphology which is characterized by platelets having axial, not spherical, symmetry. It is believed that greater brightness will be obtained from copper-activated zinc sulfide phosphors made from zinc sulfide precursor materials having an axially symmetric platelet-type particle morphology, since such particles may be more easily aligned with respect to an applied electric field.

The organic zinc salt may be, for example, zinc dithiocarbamate or zinc acetylacetonate, which are solids at room temperature, or dimethyl zinc, which is a liquid at room temperature or derivatives thereof. The copper activator may be added as an organic copper salt, such as, for example, copper dithiocarbamate, copper acetylacetonate, or dimethyl copper or derivatives thereof. The chlorine coactivator may be provided by the hydrogen chloride gas in the gaseous mixture.

If zinc dithiocarbamate is used, the reaction may proceed according to Equation 1:

$$Zn(CS_2NR_2)_2 + H_2S \rightarrow ZnS + 2CS_2 + 2R_2NH \qquad [1]$$

where R represents either ethyl or n-butyl groups. If zinc acetylacetonate is used, the reaction may proceed according to Equation 2:

$$Zn(C_5H_7O_2)_2 + 9H_2S \rightarrow ZnS + 6CH_4 + 4H_2O + 4CS_2 \qquad [2]$$

If dimethyl zinc is used, the reaction may proceed according to Equation 3:

$$(CH_3)_2Zn + H_2S \rightarrow ZnS + 2CH_4 \qquad [3]$$

The organic zinc and copper salts, if solids, must be dissolved in an organic solvent. Suitable organic solvents include, but are not limited to, toluene, alcohol, dimethyl formamide (DMF) and dimethyl sulfoxide (DMSO). The resulting organic solution contains both zinc- and copper-containing species and may then be dispersed by ultrasonic means, such as by an ultrasonic nebulizer, as a very fine vapor stream or mist into a heated reactor vessel. The reactor vessel is heated to and maintained at a reaction temperature which is no greater than about 300° C.

A gaseous mixture comprising hydrogen sulfide gas and hydrogen chloride gas is also introduced into the heated reactor vessel. An inert carrier gas, such as, for example, nitrogen or argon, may also be included in the gaseous mixture. The gases react with the zinc- and copper-containing species in the heated reactor vessel to form a precipitate consisting essentially of copper-containing zinc sulfide particles which have a platelet-type axially symmetric morphology.

The zinc sulfide particles so formed may then be processed in any of several known methods, such as, for example, the method disclosed in U.S. Pat. No. 4,859,361 to Reilly et al., hereby incorporated by reference, to obtain a copper-activated zinc sulfide electroluminescent phosphor. If, in the course of processing the zinc sulfide particles, a milling step is employed, it is important not to overwork the zinc sulfide crystals so that the platelet morphology of the crystals is not altered. If milling is necessary, it must be done gently.

While there have been shown what are at present considered to be the preferred embodiments of the invention, it will be apparent to those skilled in the art that various changes and modifications can be made herein without departing from the scope of the invention as defined by the appended claims.

What is claimed is:

1. A method of making a zinc sulfide precursor material for a copper-activated zinc sulfide electroluminescent phosphor, comprising the steps of:
   a) introducing an organic solution as a finely dispersed mist into a heated reactor vessel, wherein said organic solution contains zinc- and copper-containing species and wherein said heated reactor vessel is maintained at a reaction temperature of no greater than about 300° C.;
   b) introducing a gaseous mixture comprising hydrogen sulfide gas and hydrogen chloride gas into said heated reactor vessel; and
   c) reacting said zinc- and copper-containing species with said gaseous mixture to form a precipitate consisting essentially of copper-containing zinc sulfide particles.

2. A method according to claim 1 wherein the zinc-containing species is an organic zinc salt selected from the group consisting of zinc dithiocarbamate, zinc acetylacetonate, dimethyl zinc, and derivatives thereof.

3. A method according to claim 1 wherein the copper-containing species is an organic copper salt selected from the group consisting of copper dithiocarbamate, copper acetylacetonate, dimethyl copper, and derivatives thereof.

4. A method of making a zinc sulfide precursor material for a copper-activated zinc sulfide electroluminescent phosphor, comprising the steps of:
   a) providing an organic zinc salt and an organic copper salt;
   b) dissolving said organic zinc salt and said organic copper salt in an organic solvent to form an organic solution containing zinc- and copper-containing species;
   c) dispersing said organic solution as a fine mist into a heated reactor vessel, wherein said heated reactor vessel is maintained at a reaction temperature which is not greater than about 300° C.;
   d) introducing a gaseous mixture comprising hydrogen sulfide gas and hydrogen chloride gas into said heated reactor vessel; and
   e) reacting said gaseous mixture with said zinc- and copper-containing species to form a precipitate consisting essentially of copper-containing zinc sulfide particles.

5. A method according to claim 4 wherein said organic zinc salt is selected from the group consisting of zinc dithiocarbamate, zinc acetylacetonate, and derivatives thereof.

6. A method according to claim 4 wherein said organic copper salt is selected from the group consisting of copper dithiocarbamate, copper acetylacetonate, and derivatives thereof.

7. A method according to claim 4 wherein said organic solvent is selected from the group consisting of toluene, alcohol, dimethyl formamide and dimethyl sulfoxide.

8. A method according to claim 4 wherein said organic solution is dispersed into a fine mist by ultrasonic means.

* * * * *